United States Patent [19]
Hathaway et al.

[11] Patent Number: 5,323,320
[45] Date of Patent: Jun. 21, 1994

[54] STABILITY TEST FOR SLIP OPERATION OF TORQUE CONVERTER CLUTCH

[75] Inventors: Richard R. Hathaway, Plymouth; James J. Neigebauer, Ypsilanti, both of Mich.

[73] Assignee: Ford Motor Company, Dearborn, Mich.

[21] Appl. No.: 946,139

[22] Filed: Sep. 17, 1992

[51] Int. Cl.⁵ .............. F16D 21/04; B60K 41/22
[52] U.S. Cl. .................. 364/424.1; 192/3.58; 192/3.3; 477/169
[58] Field of Search ......... 364/424.1, 424.06; 192/0.052, 0.076, 0.092, 3.58, 3.3, 3.31; 74/866, 867, 890

[56] References Cited

U.S. PATENT DOCUMENTS

| | | | |
|---|---|---|---|
| 4,393,467 | 7/1983 | Miki et al. | 364/424.1 |
| 4,428,259 | 1/1984 | Kubo et al. | 74/867 |
| 4,499,979 | 2/1985 | Suzuki et al. | 192/3.31 |
| 4,518,068 | 5/1985 | Oguma et al. | 192/0.052 |
| 4,724,939 | 2/1988 | Lockhart et al. | 192/3.3 |
| 4,785,689 | 11/1988 | Iwatsuki et al. | 74/866 |
| 4,805,750 | 2/1989 | Nitz | 192/3.58 |
| 4,843,551 | 6/1989 | Milunas | 364/424.1 |
| 4,940,122 | 7/1990 | Fujieda | 192/3.31 |
| 4,975,845 | 12/1990 | Mehta | 364/424.1 |
| 4,993,527 | 2/1991 | Benford et al. | 192/0.076 |
| 5,046,175 | 9/1991 | Lentz et al. | 364/424.1 |

*Primary Examiner*—Thomas G. Black
*Assistant Examiner*—Jacques Harold Louis-Jacques
*Attorney, Agent, or Firm*—Frank G. McKenzie; Roger L. May

[57] ABSTRACT

In an electronically controlled transmission adapted to control operation of a torque converter clutch in softlock and hardlock modes, a test to determine whether the clutch is operating with an acceptable slip magnitude in a control region or whether it is operating with a high level of slip or instability outside the control region. The test distinguishes periods of instability associated with deterioration of the clutch from transients associated with normal operating conditions and background noise. An instability counter, interval clock and warm-up cycle counter are used to determine an appropriate point for discounting prior events and reentering the control test. Continuous slip mode of operation of the clutch is disabled entirely after a predetermined number of verified unstable events have occurred.

9 Claims, 4 Drawing Sheets

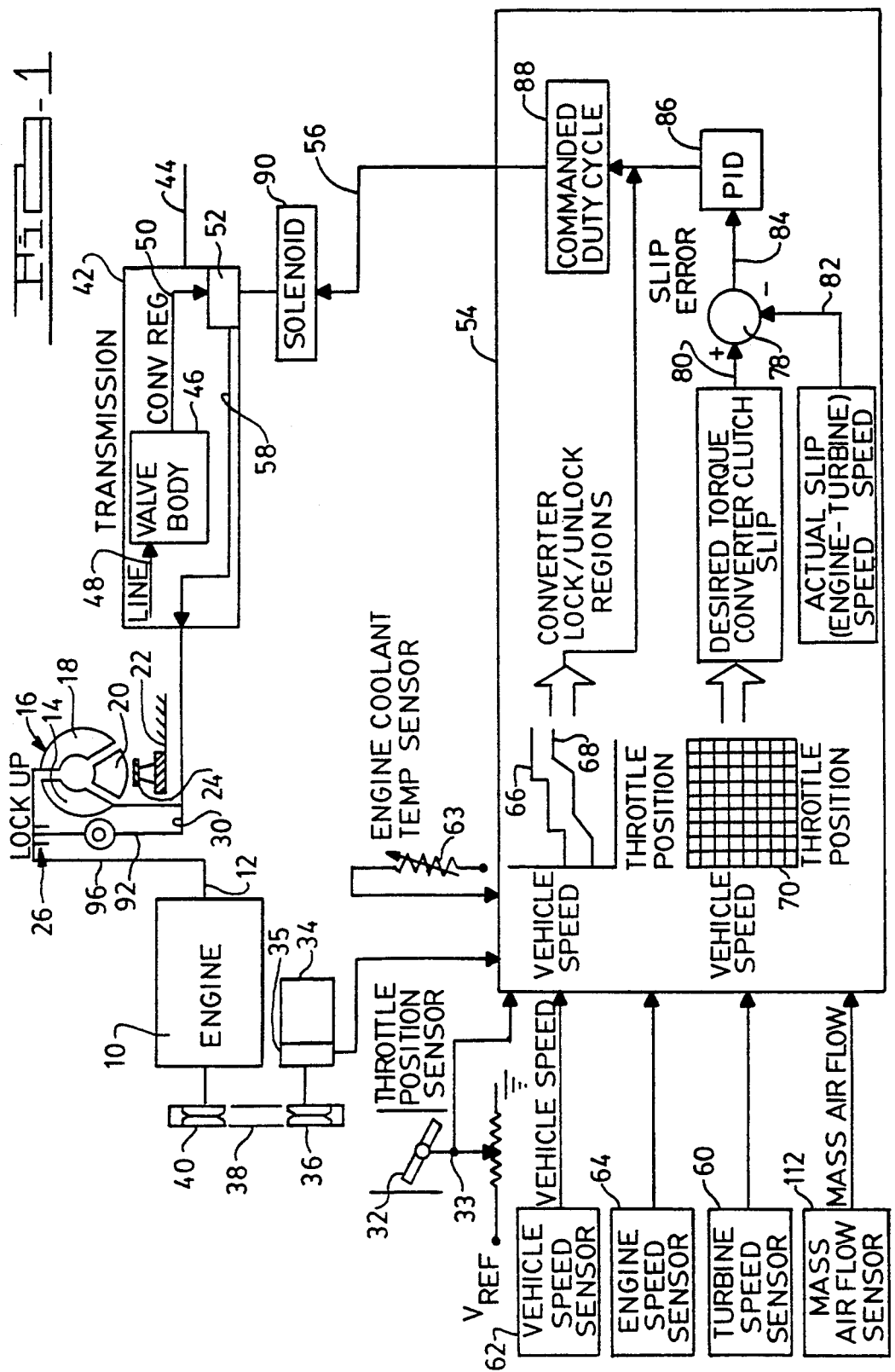

STABILITY TEST FOR SLIP OPERATION OF TORQUE CONVERTER CLUTCH

BACKGROUND OF THE INVENTION

1. Field of the Invention

This invention relates to the field of automatic transmission control, especially to a test for instability in the operation of a torque converter bypass clutch.

2. Description of the Prior Art

An automatic transmission torque converter produces a hydrodynamic connection between an impeller wheel, driven by an internal combustion engine, and a turbine wheel, connected to the input shaft of the transmission. A bypass clutch alternately driveably connects the impeller and turbine by forcing surfaces of the clutch into friction engagement and releases clutch connection of the impeller and turbine so that the turbine is driven hydrodynamically by the impeller.

The bypass clutch or lock-up clutch can be operated by alternating its status among fully disengaged, fully engaged, and continuous slip mode wherein the rotational speed of the turbine is regulated in relation to the speed of the impeller by changing the magnitude of hydraulic pressure applied to the clutch. Hydraulic fluid is an actuating medium for establishing the operating condition of the clutch. The magnitude of the hydraulic pressure supplied to the clutch to produce the fully engaged condition is substantially higher than the pressure required to develop clutch torque capacity marginally sufficient to connect the turbine and impeller. To produce continuous slip operating condition of the bypass clutch, the hydraulic pressure supplied to the bypass clutch is modulated at moderate frequency so that the clutch friction surfaces continually engage and release. Operating a converter clutch with continuous relative motion can alter the operating characteristics of the friction surfaces of the clutch over a period of time, and can cause unstable operation of the clutch.

Softlock operation of the clutch improves driveability, reduces heat generation, improves fuel economy and reduces noise and vibrations. Converter clutch instability can be detected by the vehicle operation by its adverse effect on driveability.

Various techniques have been devised to monitor operation of a torque converter lock-up clutch and take corrective action to assure proper performance under certain conditions. For example, U.S. Pat. No. 4,428,259 describes a system for fail safe operation of a torque converter lock-up clutch. It provides for the clutch to be disengaged when neither a first nor a second control pressure is applied, and to be fully engaged when control pressure is applied and governor pressure is above a first magnitude. Application of the first or second control pressures result when governor pressure reaches a first magnitude and either a first actuating pressure is present or throttle pressure is lower than a specified magnitude.

U.S. Pat. No. 4,785,689 describes a fail safe system for controlling an automatic transmission that involves detecting an abnormal relationship between the output shaft speed of the transmission and either the engine speed or the speed of a component of the transmission. When the abnormality is present, the magnitude of hydraulic pressure in the control circuit is increased so that slippage of clutches and brakes in the transmission is eliminated.

U.S. Pat. No. 5,046,175 describes a system for producing a signal indicating a malfunction in the operation of an automatic transmission. After the control system produces a signal that would ordinarily cause an offgoing clutch to become fully exhausted and clutch slip has not occurred after the signal is produced the number of no slip clutch conditions that occur within a predetermined time are counted, compared to a predetermined number, and used to produce a failure signal when the count exceeds a predetermined number. Slip condition of the clutch is determined by monitoring and comparing turbine speed and the output speed of the transmission.

SUMMARY OF THE INVENTION

It is preferable to detect unstable operation of a bypass clutch and to correct the condition by preventing the transmission control from causing the bypass clutch to operate in a continuous slip mode and by substituting on-off operation of a clutch. The method of this invention monitors converter clutch operation, determines the presence of instabilities, distinguishes instabilities from normal operating transients, counts the number of instabilities occurring over a predetermined period, compares the frequency of instabilities to a predetermined frequency, and overrides commands issued by the transmission control that would produce continuous slip operation after the number of verified instabilities exceeds a predetermined number. The method of this invention overrides subsequent control commands for continuous slip operation by substituting commands for on-off operation of the bypass clutch.

The method detects the presence of instabilities, characterized by oscillatory changes in torque converter bypass clutch slip occurring at a frequency of 0.5 to 1.5 Hz, that are sustained for several seconds. The test looks for a calibratable number of oscillations to occur within a defined frequency range. If this number of oscillations occurs, continuous slip mode is disabled and the converter clutch is required to operate only in the hardlock mode. During a testing portion of the method, if too much time passes between successive occurrences of instability, an instability counter is reset to zero to prevent counting instabilities occurring outside frequency that is characteristic of the defined converter clutch instability sought to be eliminated.

The method of this invention includes an entry mode, during which slip is monitored to determine its presence within a predetermined control region and during which parameters associated with normal operating transients are recorded and saved in electronic memory. After entering the continuous slip mode of operation, following a transient or after an instability has occurred, the bypass clutch must again reenter the control region before passing to the test mode.

After it is determined that the clutch is operating within the control region, the test mode checks that clutch slip stays within an expected operating region, in which larger oscillations than those of the control region are permitted. If slip exits the expected operating region, thereby indicating an instability, the time at which instability occurs is saved and the verified mode is entered, provided no normal operating transient occurs to account for the change in slip.

In the verify mode, the amount of time slip has remained outside of the expected operating region is continuously calculated to determine whether slip remains outside the region for a calibratable amount of time, approximately 120 msec., in order to qualify as a verified instability. If an instability is verified in this way, the counter is incremented and the test returns to the entry mode. If an instability is not verified, the test returns to the test mode.

BRIEF DESCRIPTION OF THE DRAWINGS

FIG. 1 is a schematic diagram of an automatic transmission having a torque converter clutch adapted for control by a microprocessor and solenoid-operated hydraulic valve according to this invention.

DESCRIPTION OF THE PREFERRED EMBODIMENT

Figure 2A:
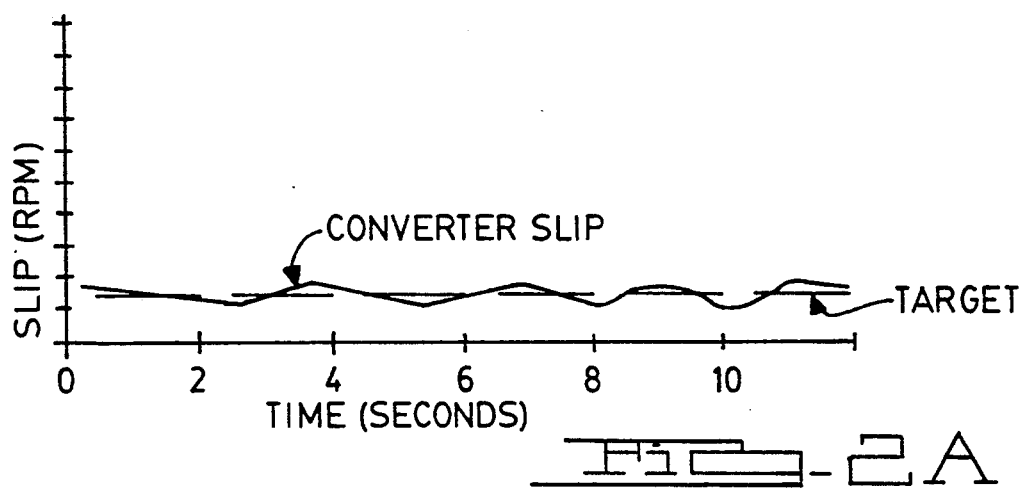
FIGS. 2A, 2B and 2C show the variation of torque converter slip versus time during normal operating conditions, after clutch deterioration and with instabilities or transients, respectively.

A powertrain for an automotive vehicle adapted for use with this invention includes an internal combustion engine 10 having a crankshaft 12 driveably connected to the impeller wheel 18 of a torque converter 16, which includes a turbine wheel 14, hydrodynamically coupled to the impeller, and a stator wheel 20, supported rotatably on shaft 22 through a one-way coupling 24. The crankshaft is driveably connected to and released from transmission input shaft 30 through operation of a torque converter lock-up clutch 26. The lock-up clutch is engaged by application of hydraulic pressure whose magnitude varies according to the control of this invention to fully release clutch 26 so that there is no mechanical connection between the crankshaft and input shaft, to hardlock or fully engage the clutch so that there is a continuous direct mechanical connection between the crankshaft and input shaft, and to softlock the clutch so that there is slip or a moderate difference in rotational speed of the crankshaft relative to the input shaft.

The engine is controlled by a throttle 32 which regulates the flow of the air/fuel mixture. A throttle position sensor 32 produces a signal representing the position of the throttle, i.e., the degree to which the throttle is fully opened.

The engine is adapted to drive various accessories such as an air-conditioning compressor 34 having sheeve 36 driveably engage by a drive belt 38 mounted rotatably on a sheeve 40 driven by the engine 10. A sensor 35 produces a signal representing engagement and disengagement of a clutch that driveably connects compressor 34 to the engine.

The transmission 42 includes multiple planetary gearsets for producing various ratios of the speed of the output shaft 44 to the speed of the input shaft 30. A valve body 46, supplied with hydraulic pressure regulated to line pressure magnitude 48, is adapted to produce converter clutch regulated pressure 50, supplied as input to a modulated lock-up solenoid-operated valve 52. A microprocessor 54 and signal conditioning circuitry 88 produce a pulse-width modulated (PWM) duty cycle on line 56, which is applied to the winding of a solenoid 90 that operates valve 52. In response to the PWM control signal duty cycle, converter clutch regulated pressure in line 50 is opened and closed so that the magnitude of hydraulic pressure supplied to lock-up clutch 26 through line 58 varies and controls operation of the clutch depending on the magnitude of the supplied pressure. The lock-up clutch 26 is fully released, fully engaged or hardlocked, and partially engaged or softlocked as a result of the response of valve 52 to the control signal supplied to solenoid 90 through line 56.

The torque converter is equipped with a speed sensor 60 that produces a signal representing the speed of the turbine wheel and applies that signal as input to microprocessor 54. Similarly, the speed of output shaft 44, is used by speed sensor 62 to produce a signal representing the speed of the vehicle, which is applied also as input to microprocessor 54. An engine speed sensor 64 produces a signal representing the speed of engine crankshaft 12 and applies that signal as input to microprocessor 54.

Stored in an electronic memory accessible to the microprocessor are two functions corresponding to each of the gear ratios produced by the transmission. In FIG. 1, a first function 66, relating vehicle speed and throttle position, is represented in a graph of those variables. When the current operating condition of the powertrain, defined by current vehicle speed and current throttle position for the current gear ratio, falls on or above curve 66, torque converter lock-up clutch 26 is hardlocked. The second function, represented by curve 68, defines a range of operating conditions represented by the variables vehicle speed and throttle position for the corresponding gear ratio such that, when the current operating condition falls on or below curve 68, lock-up clutch 26 is fully released or unlocked. When the current operating condition is in the range between curves 66 and 68, a predetermined desired torque converter slip is selected unless the control of this invention presents continuous slip operation.

In FIG. 1 a lookup table 70 representing the relationship between vehicle speed and throttle position for the current gear ratio is filled with values representing the desired torque converter lock-up clutch slip for the current operating condition. Actual slip is calculated by the microprocessor by subtracting turbine speed from engine speed and producing a signal representing the magnitude of actual slip at a terminal of a summing junction 78, where that signal is combined with the desired torque converter clutch slip determined from lookup table 70.

The difference between the value of the desired torque converter clutch slip and actual slip are combined at summing junction 78 to produce slip error, a signal carried on line 84 to the input of a proportional-integral-differential controller (PID) 86. The proportional feature Of the PID controller produces a term that varies directly with the slip error; the integral feature of the controller integrates the error signal over time and the differential features differentiates the error signal and applies appropriate gain in the conventional manner.

The output of the PID controller 86 is converted by a signal conditioning circuit 88 to a duty cycle, from which are produced alternating high voltage and low voltage periods whose durations correspond to the duty cycle value. The length of these periods corresponding to the output of the PID controller causes variation in the magnitude of the hydraulic pressure in line 58 produced by the torque converter pressure valve 52 as it moves in response to operation of solenoid 90.

The output of the torque converter bypass clutch control valve 52 is a pressure signal carried in line 58 to a space in the lock-up clutch 26 between the friction surfaces on disc 92 and the friction surfaces on the impeller casing 96, which is driveably connected to crankshaft 12. Pressure of the hydraulic fluid circulating within the torus of the torque converter is applied to one side of lock-up clutch 26 and clutch control pressure is applied to the opposite side of the clutch. Therefore, the magnitude of control pressure 58 is used to control the extent to which lock-up clutch 26 is engaged and released since the pressure circulating within the torque converter torus is substantially constant. When the control pressure in line 58 is high, clutch 26 is fully disengaged and there is no frictional driving contact between disc 92 and casing 96. On the other hand, when lock-up clutch control pressure is low, clutch 26 is fully engaged and a direct frictional hardlock connection is made between disc 92 and casing 96. Between these extremities in the magnitude of lock-up clutch pressure, clutch 26 can operate in a slip condition, controlled by the system of this invention to an acceptable range of the desired slip produced by the microprocessor in accordance with the duty cycle produced as output by PID controller 86 and circuit 88.

FIG. 2A shows the variation of slip with time during acceptable operation of the lock-up clutch, where slip varies about a target slip of approximately 16 rpm. As service use of the lock-up clutch accrues, deterioration in performance is evidenced by abrupt increases in slip about the target value occurring in brief periods, as FIG. 2A shows. This deterioration increases with service time. As the lock-up clutch operates in the softlock mode, this deterioration has been found to occur more quickly then when the lock-up clutch operates in the hardlock condition.

Spikes in lock-up clutch slip are known to result due to certain transients that occur during normal operation of the powertrain. The transients include on-and-off cycling of the air conditioning compressor, abrupt engine torque changes and abrupt changes in the engine throttle position. It is necessary to distinguish abrupt changes in slip due to normal operational transients, from instabilities in clutch slip that result due to aging and deterioration of the lock-up clutch.

Figure 2B:
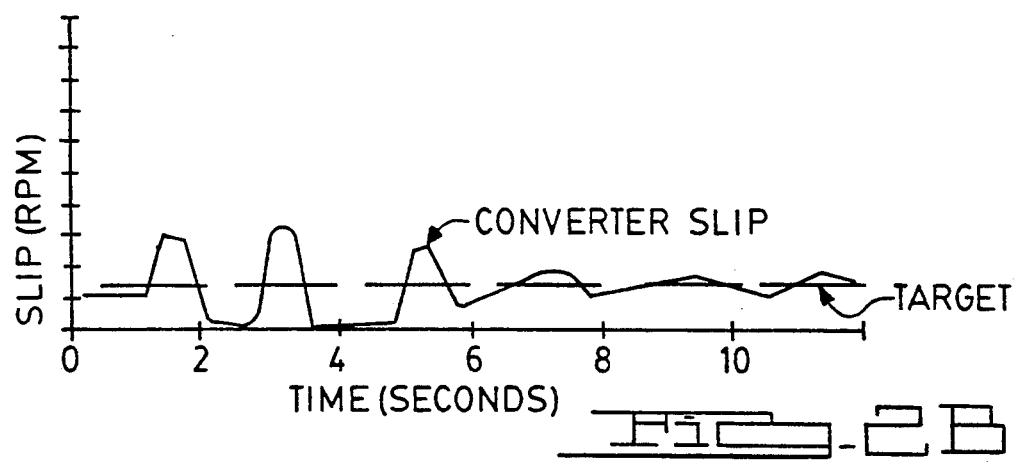

FIG. 2B illustrates still larger, longer and more frequent spikes in lock-up clutch slip due to clutch instability as evidenced by large deviations from the target value. The operator of the vehicle is likely to discern and detect these instabilities in the form of audible engine speed changes, shutter of the torque converter clutch and unexpected vehicle acceleration and deexceleration even though they are the result of deterioration of the torque converter clutch. An extreme condition of lock-up clutch deterioration would result in spikes that are approximately 100 rpm, even during steady state operating conditions and without the occurrence of normal powertrain transients, such as those mentioned above.

Figure 2C:
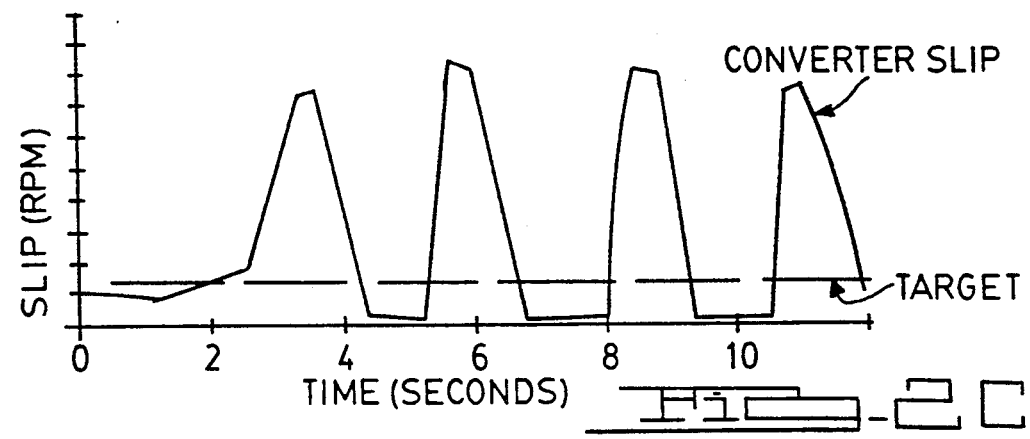

The microprocessor is used to control many functions and systems of the motor vehicle including the engine, clutches and brakes of the transmission that produce the various gear ratios and, of course, the torque converter lock-up clutch. The microprocessor has access to electronic memory in the form of read-only-memory which is executed sequentially in modules during each background loop, each module dedicated to a particular task of the microprocessor. One of these modules is dedicated to control of lock-up clutch 26 and a portion of that module is dedicated to testing whether the torque converter lock-up clutch is operating correctly or with unacceptable instabilities, those represented in and discussed with respect to FIG. 2C.

Figure 3A:
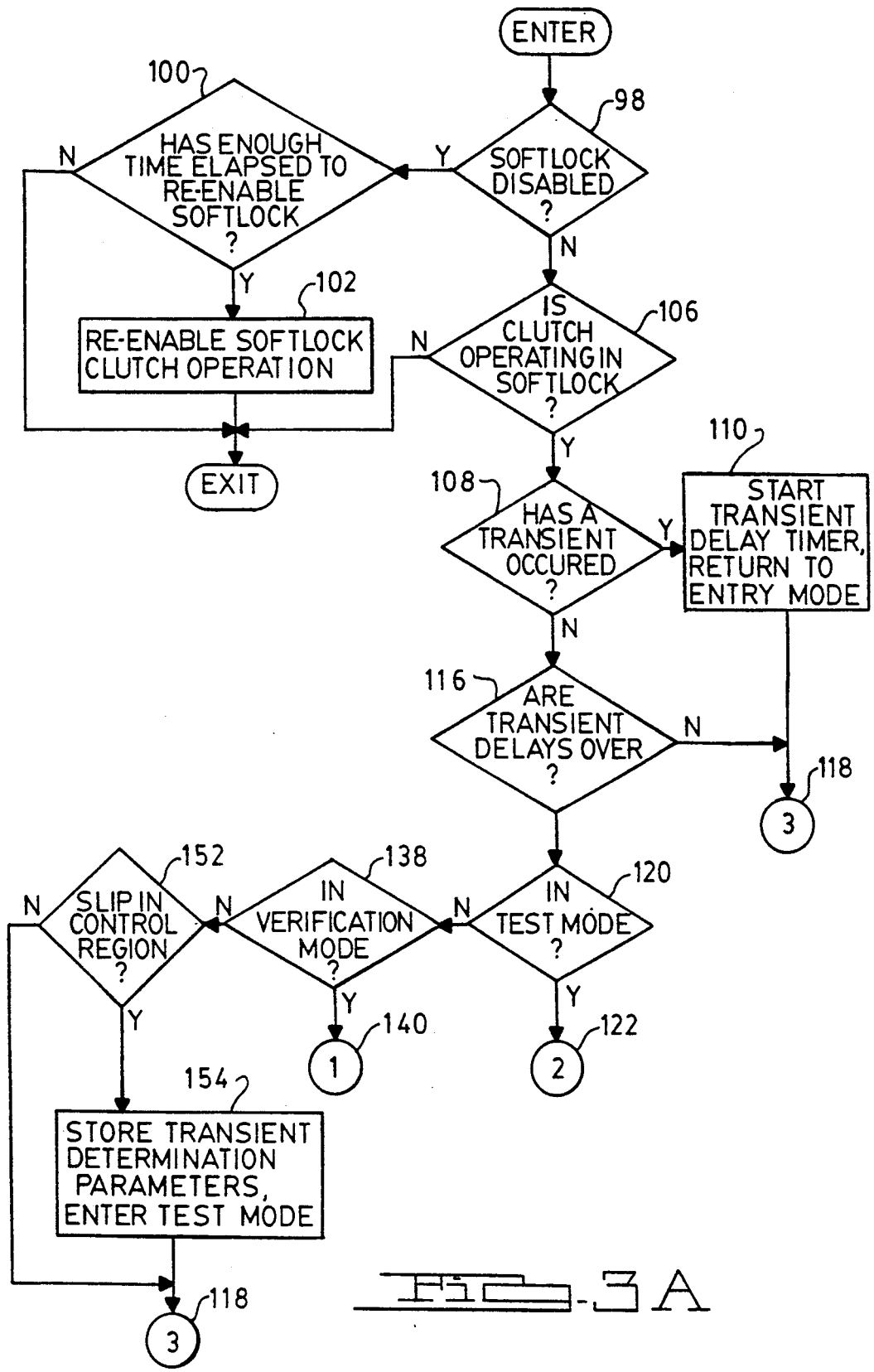
FIGS. 3A and 3B taken together constitute a diagram of the logic for controlling the system of FIG. 1.
Figure 3B:
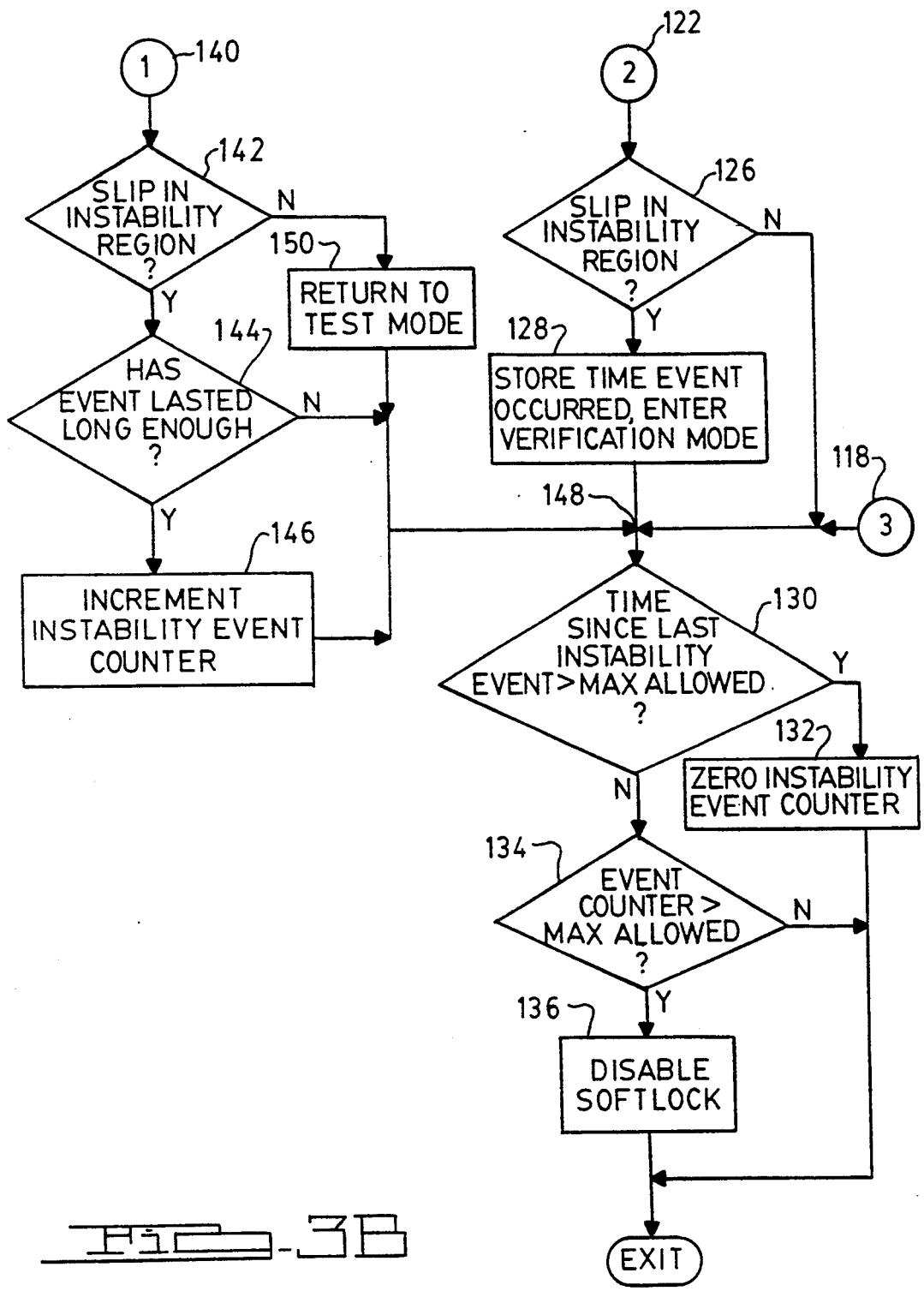

Refer now to FIGS. 3A and 3B, which together outline the sequence of control statements in the module that tests for the instabilities associated with the operation of lock-up clutch control and disables operation of the lock-up clutch in the softlock mode when instabilities are detected, provided they satisfy certain criteria. After entering this control module, an inquiry is made at 96 to determine whether the softlock mode of operation of the lock-up clutch is currently disabled. This check is made by examining whether a flag indicating this disablement has been set.

If softlock is disabled, control passes to test 100 where it is determined whether sufficient time has elapsed to reenable softlock after it has been disabled. The answer to inquiry 100 is determined on the basis of the number of warm-up cycles of the engine coolant that have been counted since the softlock mode of operation of the torque converter lock-up clutch was disabled. A warm-up cycle is defined as one occurrence of the engine coolant temperature increasing from below 120° F. to above 150° F. The number of such warm-up cycles required to satisfy the elapsed time requirement at this inquiry is fourteen. If fourteen warm-up cycles have occurred since softlock was disabled, control passes to 102 where clutch softlock operation is reenabled by issuing a statement and setting a flag indicating that softlock mode of operation is permitted during execution of the next background loop. Thereafter, the current control module is exited at 104. If an insufficient time has passed since softlock was disabled, no flag is set to indicate that the softlock mode should be reenabled and execution of this module is terminated at 104.

If softlock had not been disabled when the inquiry was made at 98, control passes to 106 to determine whether the clutch is operating in the softlock mode by comparing current slip error to a constant located in memory, ERR TST BRK, the maximum value of current slip error to allow the continuous slip test mode to be initialized. If the converter clutch is operating in the hardlock mode, there can be no instability and the control module is exited at 104.

If the converter clutch is operating in softlock, control passes to 108 where it is determined whether a normal operation transient such as disturbance of engine throttle position, status change of the air-conditioning compressor 34, or engine torque position causes clutch slip to change by a predetermined amount. If any such transients have occurred, the transient delay timer is started at 110. Control is returned to another portion of the control algorithm, the entry mode 118.

The modulated bypass clutch continuous slip test software has three modes: entry, test and verify. During the entry mode, the software looks for the magnitude of slip across the torque converter clutch to enter a control region, where current slip error is less than a predetermined magnitude of slip. If slip is within the control region, the entry mode determines if the test mode can be entered. If the transmission is operating in the softlock mode, following a transient or other such disturbance, the control software must enter the control region before the test mode is entered.

After slip enters the control region and the control software calls the test mode into operation, slip must stay within an expected operating region, a second predetermined slip magnitude that is compared to the current slip error. As long as there has been no transient to account for a change is slip, the software continues to operate in the test mode. If the converter clutch breaks away, i.e., if slip exceeds the second predetermined slip magnitude, control passes to the verify mode.

In the verify mode, the time when slip enters the breakaway zone is stored by the microprocessor and the software then looks for slip to remain in the breakaway region for a calibratable period in order to verify that a breakaway has occurred and to prevent background noise from being confused with and being considered incorrectly a converter clutch breakaway. If a breakaway is verified, the verify mode looks for the time between consecutive breakaways to determine if the frequency of the breakaway is within an expected range. If the time between breakaways is within that range, a breakaway counter is incremented; otherwise the breakaway counter is reset to zero. The software returns to entry mode awaiting slip to reenter the control region before testing for instabilities again. After a calibratable number of breakaways have occurred, the continuous slip mode is disabled until a calibratable number of warmup cycles has been counted.

A transient associated with cycling the air-conditioning compressor 34 is determined by recording occurrences of the engagement of a clutch 35, which driveable connects compressor 34 to sheeve 36 of the belt drive system that transmits power from the engine to the compressor. Transient changes in the position of the engine throttle are determined by monitoring the signal produced by throttle position sensor 33. Transients associated with engine torque variations are determined with reference to a signal produced by mass air flow sensor 112, a device that measures the mass flow rate of air entering the intake manifold of engine 10; the engine speed signal; and engine mapping data relating engine speed to engine load or torque stored in electronic memory. Engine torque is calculated from data provided by the mass air flow sensor, which is then used with the engine speed to probe the engine data, in the form of a look-up table, accessible using those two variables and produced from the table as a result the current engine torque.

If after executing the inquiry at 108 it is determined that a transient has not occurred since the last background loop was executed, control passes to statement 116 to determined whether a sufficient period of delay following a prior transient has occurred. This period is arbitrarily selected as three seconds. If that length of time is not exceeded, control passes to 118. But if the period between transients exceeds three seconds, control passes to 120 where a test is executed to determine whether the control is operating in the test mode.

At 120 the current slip error is compared to a predetermined slip magnitude that indicates whether the torque converter clutch has been broken away, i.e., experienced an instability.

SLIP ABS−SLIP DES <ERR BRK AWAY

The value of the variable ERR BRK AWAY is arbitrarily selected as 60 rpm. If this relationship is satisfied, i.e., the slip error is less than 60 rpm, then control proceeds to statement 122. If the test at statement 120 is false, i.e., an instability or breakaway has occurred, control is directed to 138.

After entering the test mode at 122 control passes to 126 in order to determine whether the converter clutch is operating in a region of instability, i.e., where the slip error is greater than 60 rpm. If slip error exceeds 60 rpm, thereby indicating an instability in operation of the torque converter clutch, the control software stores at 128 the time that the instability event occurred and a flag is set to indicate that during the next execution of a background loop the verify mode is to be entered. If however the torque converter clutch is not in an instable region, control passes to 118 in order to check the frequency of the instability events.

An inquiry is made at 130 to determine if the length of the period since the last instability occurred is more than the length of a predetermined period, arbitrarily set at five seconds. If so, at 132 the instability event counter is zeroed and the breakaway is discounted as an instability because the frequency of instabilities is too low. However, if the last instability occurred less than five seconds before the next instability is detected, the frequency of instabilities is in the range that is considered acceptable and verified; therefore, the event counter is incremented and its count is compared to a maximum number of instabilities, arbitrarily four verified instability events. At 134, if more than four instability events have not been counted, the control is exited in the same way as it is after the instability event counter is zeroed. If the number in the instability event counter exceeds the maximum allowed number, the control entirely disables the softlock mode of operation of the torque converter clutch at 136. As long as these conditions exist, continuous slip operation of the torque converter clutch is disabled by replacing each softlock commanded duty cycle signal on line 56 with a signal that produces hardlock or fully engaged torque converter application.

If the test made at 120 is negative, a test is made at 138 to determine whether the control is in the verify mode by checking whether an appropriate flag has been set. In the verify mode, the time when slip enters the instability region is stored in memory and the control continually tests whether slip remains in the instability region for a calibratable period in order to verify that an instability has occurred. This action prevents noise from being counted as an instability.

In FIGS. 2A and 3B, after executing statement 138 and directing control to 140, a test is made at 142 to determine whether slip is in the instability region by comparing slip to 60 rpm. If slip is within the instability region, the duration of the instability is tested at 144 to determine whether it exceeds a predetermined arbitrarily period 120 msec to distinguish instabilities from background noise. If these two conditions exist, the instability is verified, the instability event counter is incremented at 146, and control passes to 148 and to the control statements that follow 148, as previously described. If slip is not within the instability region when tested at 142, control is directed at 150 to return, in the next execution of the background loop, to the test mode at 122.

If after testing at 138 whether the control is in the verify mode and that inquiry produces a negative, control passes to 152 in order to determine whether the magnitude of slip is within the control region by comparing slip to 20 rpm. If slip is less than 20 rpm, the control presumes that slip is operating within the control region, i.e., the torque converter clutch is operating without instability except those that are associated with expected transient conditions. The parameters associated with each of the known transients are stored at 154 and control is directed to 118. These parameters include the minimum value of engine throttle position at the entry of the continuous slip test, the minimum value of engine torque delivered to the torque converter impeller and the state of the air-conditioning compressor clutch 35 at entry of the converter clutch continuous slip test. If after making the test at 152 slip is determined to be outside the control region, the transient parameters are not stored and control is directed immediately to 118.

Before the control returns to the entry mode of operation, it awaits slip returning to the control region for testing slip, in order to ensure that each instability occurrence is counted only once.

We claim:

1. In a powertrain that includes an automatic transmission and control system that produces softlock and hardlock operation of a torque converter clutch, a method for controlling operation of the clutch, comprising the steps of:
   determining the magnitude of slip across the clutch and the frequency of occurrences of slip greater than a predetermined magnitude;
   discounting the occurrence of normal operating transients that cause said slip to exceed a predetermined magnitude;
   determining whether the frequency of occurrences of slip greater than said predetermined magnitude is within a predetermined frequency range;
   counting the number of slip occurrences that exceed said predetermined magnitude and are within said predetermined frequency range;
   comparing said count to a predetermined count; and
   disabling softlock operation of the clutch and permitting only hardlock operation of the clutch if the number of counts exceeds said predetermined count.

2. The method of claim 1, further comprising:
   determining the length of time between successive counts and comparing said length of time to a predetermined period;
   resetting said count to zero if the length of time between successive counts exceeds said predetermined period; and
   disabling softlock operation of the clutch and permitting only hardlock operation of the clutch if the number of counts exceeds said predetermined count and the length of time between successive counts does not exceed said predetermined period.

3. The method of claim 1, further comprising:
   determining whether said slip exceeds said predetermined magnitude for a period of predetermined length; and
   determining whether the frequency of occurrences of slip greater than said predetermined magnitude and of said predetermined length is within a predetermined frequency range.

4. The method of claim 1, further comprising:
   counting the number of occurrences of an operating condition of a powertrain to which the control system is applied that follow the disabling step; and
   reenabling softlock operation of the clutch when said number of occurrences reaches a predetermined number of said occurrences.

5. In an automatic transmission control system that produces softlock and hardlock operation of a torque converter lockup clutch, a method of testing for unacceptable operation of the clutch and taking corrective action, comprising the steps of:
   determining whether the magnitude of slip across the clutch is less than a first predetermined magnitude;
   determining the frequency of occurrences of clutch slip greater than said predetermined magnitude;
   determining whether the frequency of occurrences of slip greater than said predetermined magnitude is within a predetermined frequency range;
   counting the number of slip occurrences that exceed said predetermined magnitude is within a predetermined frequency range;
   comparing said count to a predetermined count; and
   disabling softlock operation of the clutch and permitting only hardlock operation of the clutch if the number of counts exceeds said predetermined count.

6. A method for controlling unacceptable operation of an automatic transmission torque converter lockup clutch with the aid of a digital computer, comprising the steps of:
   repetitively determining whether the magnitude of slip across the clutch is less than a first predetermined magnitude;
   repetitively monitoring and disregarding the occurrence of normal operating transient conditions that cause said slip to exceed said first predetermined magnitude;
   storing in computer memory the time when slip exceeds the first predetermined magnitude; and
   calculating the length of the period that slip remains greater than the first predetermined magnitude;
   calculating in the computer the length of the period between successive occurrences of slip being greater than the first predetermined magnitude to determine a frequency thereof;
   comparing the frequency of occurrences of slip being greater than said first predetermined magnitude to a predetermined frequency stored in computer memory;
   repetitively counting in the computer the number of slip occurrences that exceed said predetermined magnitude and are less than said predetermined frequency;
   repetitively comparing said count to a predetermined count stored in computer memory; and
   producing a signal that disables softlock operation of the clutch and permits hardlock operation of the clutch if the number of counts exceeds said predetermined count.

7. The method of claim 6, further comprising:
   determining the length of time between successive counts and comparing said length of time to the length of a predetermined period;
   resetting said count to zero if the length of time between successive counts exceeds the length of said predetermined period; and
   producing a signal that disables softlock operation of the clutch and permits hardlock operation of the clutch if the number of counts exceeds said predetermined count and the length of time between successive counts does not exceed said predetermined period.

8. The method of claim 6, further comprising:
   repetitively determining whether said slip magnitude exceeds said predetermined magnitude for a period of predetermined length; and
   determining whether the frequency of occurrences of slip being greater than said predetermined magnitude and of said predetermined length is within a predetermined frequency range.

9. The method of claim 6, further comprising:

counting the number of occurrences of an operating condition of a powertrain to which the control method is applied that follow the disabling step; and producing a signal that reenables softlock operation of the clutch when said number of occurrences reaches a predetermined number of said occurrences.

* * * * *